United States Patent

Ruer

[11] Patent Number: 5,858,060
[45] Date of Patent: Jan. 12, 1999

[54] MAGNETIC SEPARATION METHOD FOR IRON CARBIDE

[75] Inventor: Jacques Ruer, Le Pacq, France

[73] Assignee: TH Engineering France S.A., Montreuil Cedex, France

[21] Appl. No.: 945,636

[22] PCT Filed: Apr. 30, 1996

[86] PCT No.: PCT/FR96/00658

§ 371 Date: Jan. 20, 1998

§ 102(e) Date: Jan. 20, 1998

[87] PCT Pub. No.: WO96/34692

PCT Pub. Date: Nov. 7, 1996

[30] Foreign Application Priority Data

May 4, 1995 [FR] France .................................. 95 05356

[51] Int. Cl.$^6$ ............................. B03C 1/015; C01B 31/30
[52] U.S. Cl. ............................. 75/566; 266/160; 266/171
[58] Field of Search .................................. 266/160, 168, 266/171; 75/10.32, 566, 658; 423/148; 209/8, 11, 214

[56] References Cited

U.S. PATENT DOCUMENTS 3,936,372  2/1976  Frangiskos .................................. 209/8
4,396,423  8/1983  Stephens, Jr. et al. ................. 75/10.32
4,398,945  8/1983  Stephens, Jr. ............................. 423/148

FOREIGN PATENT DOCUMENTS 1177575  9/1964  Germany .
1219980  1/1971  United Kingdom .

*Primary Examiner*—Scott Kastler
*Attorney, Agent, or Firm*—Pollock, Vande Sande & Amernick

[57] ABSTRACT

A method for purifying iron carbide begins by feeding ore to a reaction chamber. A mixture of iron, iron oxides, gangue, and iron carbides is extracted from the reaction chamber. The temperature of the mixture is then adjusted to a range of 400°–500° C. The mixture, at the adjusted temperature, is subjecting to a first magnetic field for separating the mixture into a magnetic fraction including iron and iron oxides from a non-magnetic fraction including gangue and iron carbides. This is followed by a cooling of the non-magnetic fraction of gangue and iron carbides below the Curie temperature of iron carbide. The gangue and iron carbides are subjecting to a second magnetic field for separating the iron carbides, that become magnetic, from the gangue that remains non-magnetic.

13 Claims, 4 Drawing Sheets

MAGNETIC SEPARATION METHOD FOR IRON CARBIDE

FIELD OF THE INVENTION

The invention relates to a process for the purification of iron carbide. Iron carbide $Fe_3C$ is produced industrially by reaction, in an industrial furnace generally consisting of a fluidized-bed reactor, of a mixture of iron oxides in a reducing atmosphere which is rich in hydrogen and methane. The $Fe_3C$ obtained at the outlet of the reactor is not pure: it contains, of course, a large quantity of $Fe_3C$, of the order of 90 to 95%, and also Fe, 0.5 to 1.5%, iron oxides, essentially magnetite $Fe_3O_4$, 2 to 5%, as well as gangue, for example $SiO_2$ whose nature varies depending on the origin, is used as ore. This mixture based on iron carbide $Fe_3C$ is used as the supply of metal in an electrical steelworks furnace.

BRIEF DESCRIPTION OF THE INVENTION

The invention relates more particularly to a process making it possible to purify iron carbide, in particular to separate the impurities present with the iron carbide $Fe_3C$.

To this end, the ferromagnetic properties of the various components are employed. It is known, from U.S. Pat. No. 4,396,423, a proces for the recovery of iron carbide and zinc from a gangue of ore, after a carbiding step and before separation of zinc from iron carbide. Thus, it is known that iron carbide $Fe_3C$ is ferromagnetic at ambient temperature and that this property disappears above a certain temperature, called the Curie temperature. In particular, as regards $Fe_3C$ and depending on its characteristics, this Curie temperature varies from 180° C. to 230° C.

This same property is also valid for the compounds mixed with the $Fe_3C$, 768° C. for Fe and 575° C. for $Fe_3O_4$. These values are indicative and may vary depending on the chemical purity of the samples.

The object of the present invention is to make it possible to exploit this property in the various withdrawal zones of a fluidized-bed reactor for manufacturing iron carbide, by proposing separation steps at different temperatures which are chosen as a function of the Curie temperatures of the various components mixed with the iron carbide, in order to obtain a purification of the iron carbide at the end of this succession of separation steps.

To this end, the process for the purification of iron carbide, is characterized in that:

a mixture of iron carbide, iron, iron oxides and gangue is extracted from a reaction chamber, the emerging mixture is optionally slightly cooled, the heat recovered being used for heating the products in the recycling phase, in an atmosphere of composition suitable for not destroying the iron carbide, the mixture, whose temperature lies between 230° and 575° C., passes through a first magnetic field, thus making it possible to separate it into a magnetic fraction (iron and oxides) and a non-magnetic fraction (iron carbide and gangue), the non-magnetic fraction is sent to a chamber in which it is cooled to a temperature below the Curie temperature of iron carbide, the mixture consisting of gangue and iron carbide passes through a second magnetic field, thus making it possible to separate it into a magnetic fraction (iron carbide) and a non-magnetic fraction (gangue).

Other characteristics and advantages of the present invention will emerge from the following description, given with reference to the appended drawings which illustrate an entirely non-limiting illustrative embodiment thereof. In the figures:

DETAILED DESCRIPTION OF THE INVENTION

Figure 1:
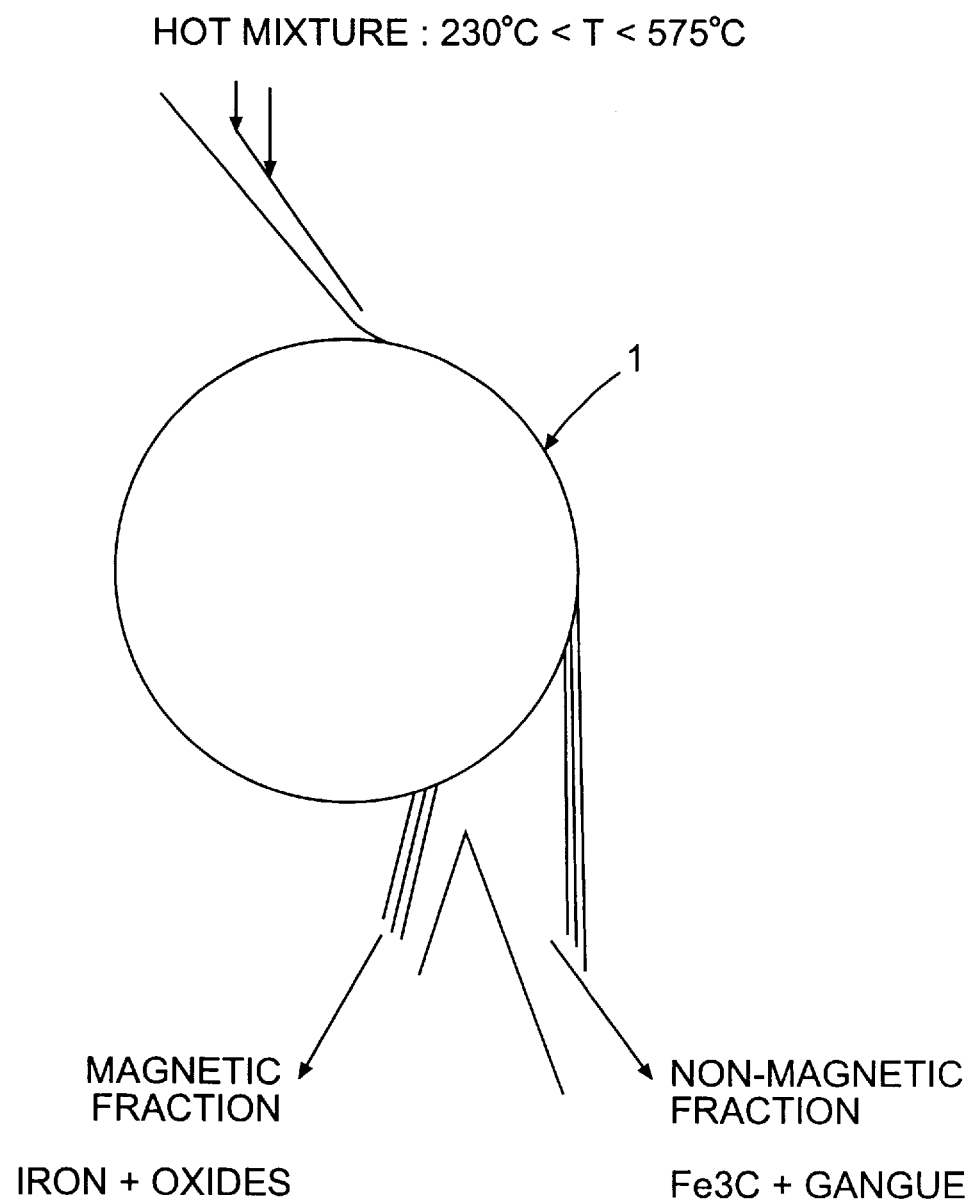
FIG. 1 is a schematic diagram illustrating the process of magnetically sorting a mixture.
Figure 2:
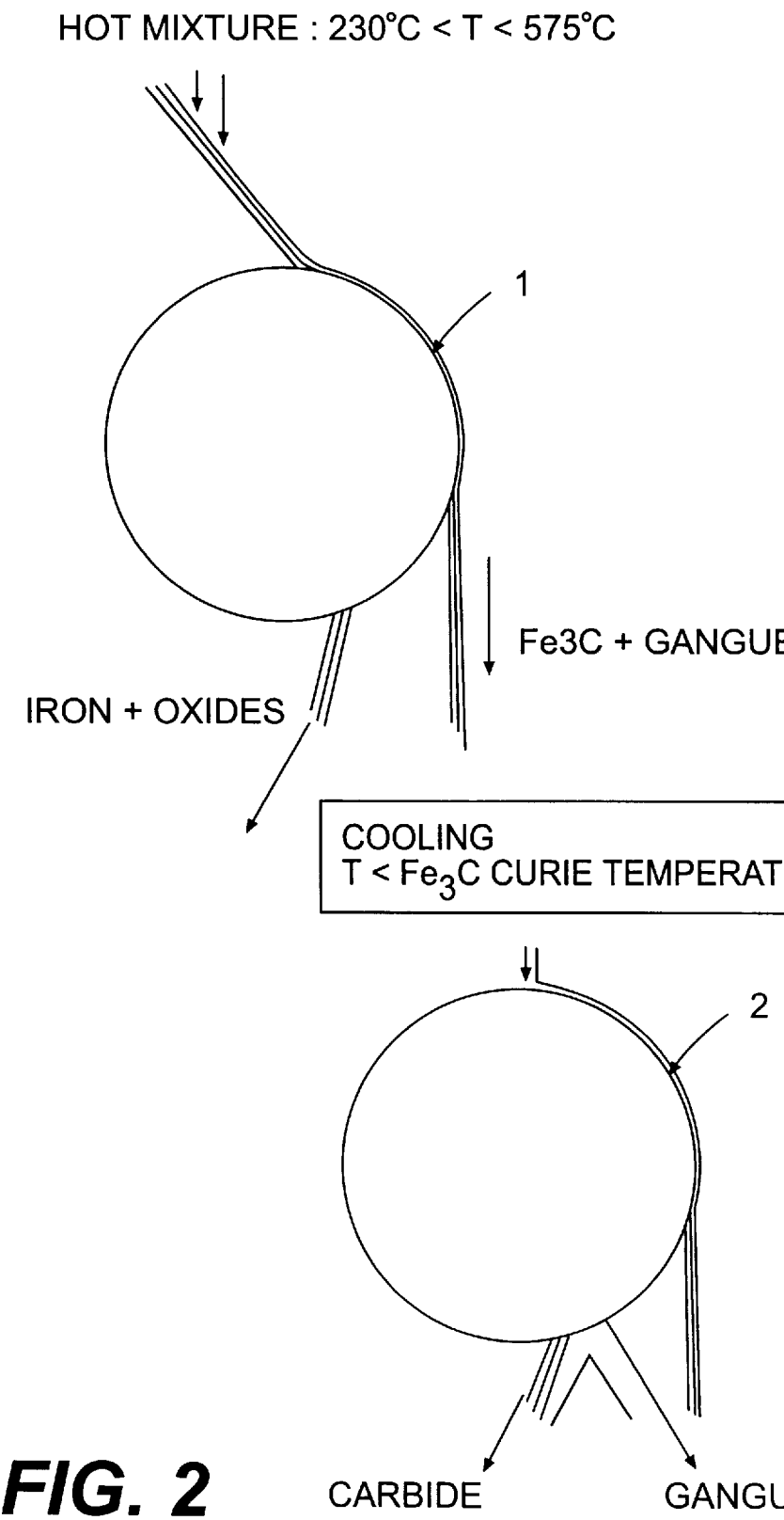
FIG. 2 is a schematic view illustrating the process of magnetically sorting a mixture containing iron carbide.
Figure 3:
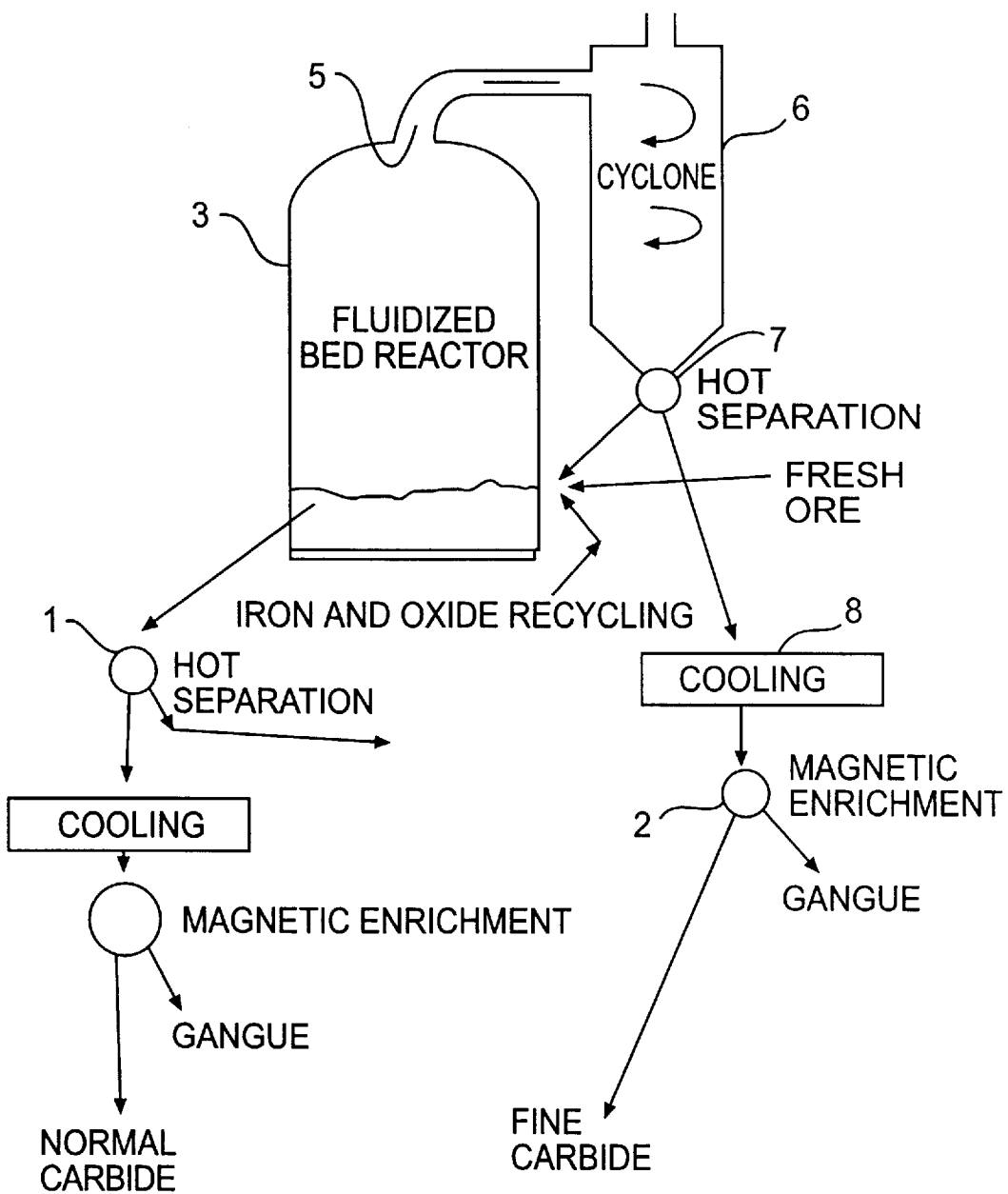
FIG. 3 illustrates the application of the magnetic separation process to a fluidized-bed reactor.
Figure 4:
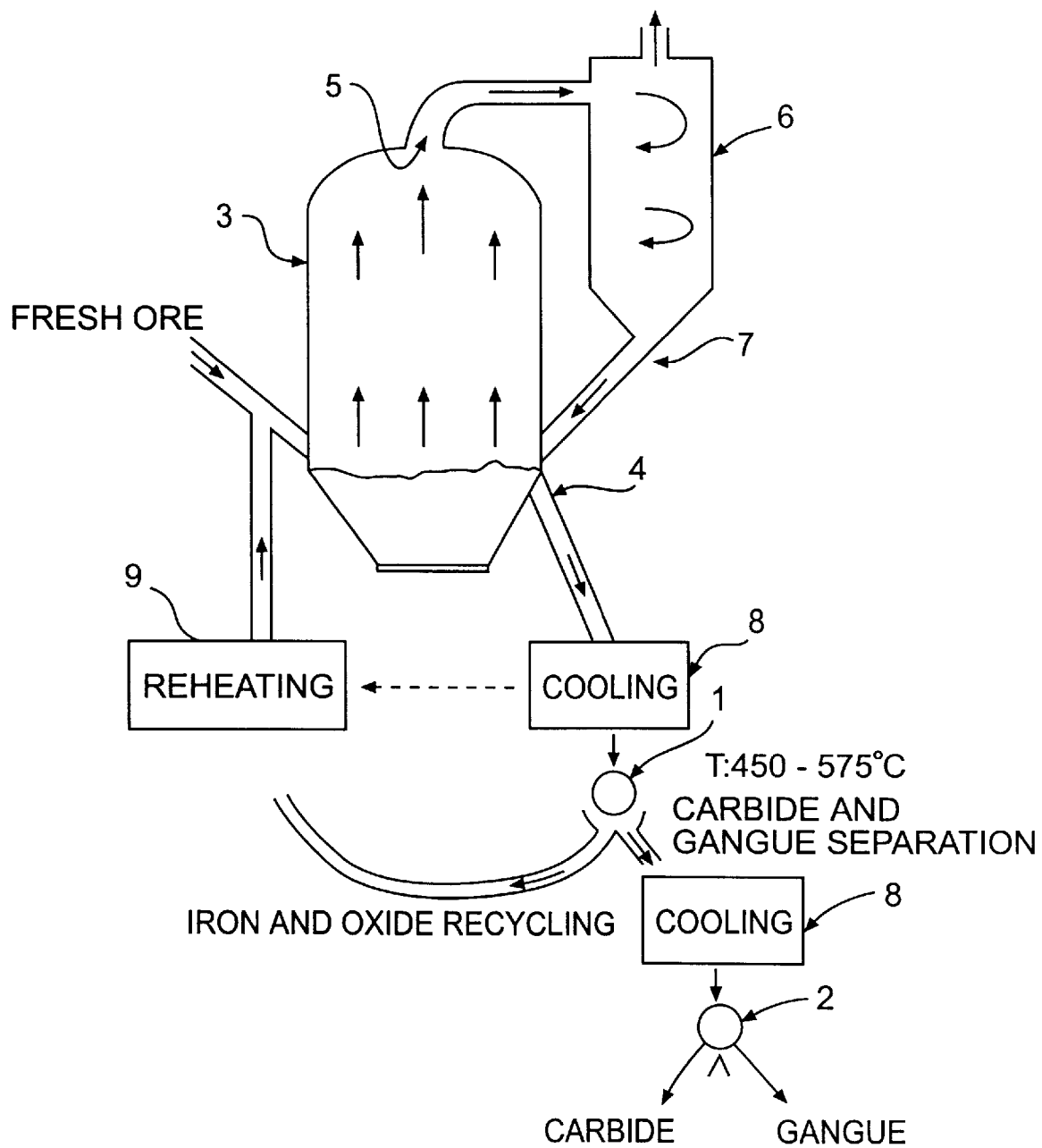
FIG. 4 illustrates the application of the magnetic separation process to a circulating fluidized-bed reactor.

According to a preferred embodiment of a plant for implementing the process forming the subject-matter of the invention, it mainly includes at least one magnetic separator 1, 2, advantageously arranged at the outlet of the withdrawal zones of a fluidized-bed reactor 3.

In an application to the manufacture of iron carbide, a fluidized-bed reactor 3, containing a charge of iron ore fines reacting within a reducing atmosphere, in particular rich in hydrogen and in methane and/or light hydrocarbon (ethane, propane, butane) generally has two withdrawal zones 4,5: one placed in the lower part (main withdrawal zone) and the other placed in the upper part (secondary withdrawal zone) and connected to a cyclone 6 which is itself equipped with a withdrawal zone 7. In known fashion, the reaction temperature of the mixture of iron ore and iron carbide lies in a temperature range of between 450° C. and 600° C., and this temperature advantageously lies, in particular, in a range of the order of 550° to 600° C.

Furthermore, a flow of reducing gas for fluidizing the ore particles and converting them into iron carbide flows through this reactor, and a non-negligible portion of the solids is entrained out of the reactor via this flow, towards the cyclone 6 which recycles these particles to the reactor 3.

The recycling, although necessary for increasing the yield, has two main drawbacks:

on the one hand, there is a high probability of the fines being entrained once more, so that the cyclone is loaded with a flow of solids passing through it several times;

on the other hand, recycling from the cyclone takes place at a given point in the reactor, so that a much greater proportion of fines than in the other neighbouring regions coexists in this zone, which causes inhomogeneous fluidization conditions in all the parts of the reactor.

These heterogeneity conditions are prejudicial to correct operation of the reactor 3, in particular when this reactor is large.

It is therefore necessary to provide steps at the outlet of the cyclone 6 and of the reactor 3 with a view to separating the various grades of particles.

Thus, at the outlet of the reactor 3, a fraction of the circulating mixture of iron carbide, iron oxides, iron and gangue is withdrawn, its temperature is adjusted to between 400° and 575° C. and it is sent to a magnetic separator 1 in order to divide the mixture into a magnetic fraction, consisting mainly of components whose Curie temperature is less than the temperature of the mixture of iron and iron oxide, and into a non-magnetic material, consisting mainly of components whose temperature is greater than the Curie temperature of these components (these are, in particular, carbide and gangue).

The emerging mixture is optionally slightly cooled, it being possible to use the heat recovered for heating the products in the recycling phase or fresh ore, in an atmosphere of composition suitable for not destroying the iron carbide; this atmosphere essentially includes a mixture based on methane and hydrogen, the exact composition of which depends, in particular, on temperature and pressure.

The fraction containing the iron and iron oxides is then sent to the reactor for conversion into iron carbide. The non-magnetic fraction, at the first separation temperature, is sent to a cooling phase 8, in particular implemented in a chamber in which it is cooled to a temperature below the Curie temperature of iron carbide.

Downstream of this step, the sorting is once more carried out using a magnetic separator 2. The magnetic field produced by this second separator divides the entering fraction into a magnetic fraction (iron carbide) and into a non-magnetic fraction (gangue).

The magnetic iron carbide fraction obtained at the outlet of this separator constitutes the main withdrawal of the reactor 4 and the particles obtained have a size distribution of between 100 μm and 1000 μm mean diameter.

At the outlet of the cyclone 7, a separation step for the circulating fines is also provided, the temperature of the mixture also lying in the range of 230° to 575° C.; within a magnetic separator it is possible to sort the circulating mixture into two fractions, respectively magnetic and non-magnetic. In similar fashion to the separation step 1, 2 provided at the outlet of the reactor 3, a first fraction consisting essentially of iron oxide and iron fines is obtained, and these are reintroduced into the bed of the reactor to be converted into iron carbide. The second fraction of gangue and iron carbide fines, iron carbide being non-magnetic at this temperature, is sent to a cooling step 8 essentially consisting of a chamber making it possible to cool this fraction to a temperature below the Curie temperature of iron carbide. The fraction consisting of iron carbide and gangue is then sent to a magnetic sorting phase which makes it possible to separate the magnetic components (iron carbide fines) from the non-magnetic components (gangue fines). At the end of this magnetic sorting step, the iron carbide consists essentially of particles whose size is less than or equal to 100 μm.

According to another variant, the process for purification by magnetic separation is applied within a circulating fluidized-bed reactor. This reactor 3 differs from the previous reactor in that it includes only one withdrawal zone.

Thus, this circulating fluidized-bed reactor includes, downstream of its withdrawal zone 4, a cooling step 8 whose purpose is to cool the mixture of iron carbide, iron oxides, gangue and iron to a temperature lying in the range of 400° to 575° C. in order to make it possible to divide the mixture, at the outlet of a magnetic separator 1, 2, into a magnetic fraction (iron and iron oxides) and into a non-magnetic fraction (iron carbide and gangue). The iron and iron oxides fraction, for conversion into iron carbide, is reintroduced into the bed of the reactor 3 after having been heated in an exchanger 9.

The non-magnetic fraction is sent to a second cooling step 8 in order to reduce the temperature of the mixture to a temperature below the Curie temperature of iron carbide.

Finally, having become magnetic, this mixture fraction passes through a magnetic separation unit in order to divide the iron carbide from the gangue.

Whatever the method of manufacture of iron carbide, within a simple fluidized-bed reactor or a circulating fluidized-bed reactor, the iron carbide particles should be cooled to below 300° C. in order to prevent them from igniting. It is actually expedient to cool them to a temperature close to ambient temperature.

If the magnetism of the material at the outlet of the reactor is sufficient, this property is used in order to promote transport by arranging magnetizer units along the transfer lines. If, on the other hand, the remanent magnetism is a hindrance to transport, demagnetizer units are provided.

The invention described above affords numerous advantages:

by virtue of selective separation of the components of the mixture, according to their nature and their particle size distribution, the operation of a fluidized-bed reactor is improved as regards its stability and its conversion yield;

the magnetic separation can also be applied to the iron carbide at the outlet of the bed in order to improve the quality of the iron carbide.

It is to be clearly understood that the present invention is not limited to the illustrative embodiments described and represented above, but that it encompasses all variants thereof.

I claim:

1. Process for the purification of iron carbide, wherein:

a mixture of iron carbide, iron oxides, iron and gangue is extracted from a reaction chamber, the emerging mixture is optionally slightly cooled, any heat recovered being used for heating the products in a recycling phase, in an atmosphere of composition suitable for not destroying the iron carbide, the mixture, whose temperature lies between 230° and 575° C., passes through a first magnetic field, for separating it into a magnetic fraction of iron and oxides and a non-magnetic fraction of, iron carbide and gangue the non-magnetic fraction is sent to a chamber in which it is cooled to a temperature below the Curie temperature of iron carbide, the mixture consisting of gangue and iron carbide passes through a second magnetic field, for separating it into a magnetic fraction of iron carbide and a non-magnetic fraction of gangue.

2. Process for the purification of iron carbide according to claim 1, wherein the first magnetic separation takes place at a temperature of between 400° C. and 575° C.

3. Process for the purification of iron carbide according to claim 1, wherein particles, separated by the second magnetic field, have a mean diameter that lies between 100 and 1000 μm at the outlet of the main withdrawal of the reaction chamber and fines of mean diameter less than 100 μm.

4. Process for the purification of iron carbide according to claim 2, wherein particles, separated by the second magnetic field, have a mean diameter that lies between 100 and 1000 μm at the outlet of the main withdrawal of the reaction chamber and fines of mean diameter less than 100 μm.

5. Plant for implementing the process according to claim 1, further including a fluidized-bed reactor comprising a charge of iron ore fines reacting within a reducing atmosphere, and having two withdrawal zones: a lower main withdrawal zone and an upper secondary withdrawal zone, and connected to a cyclone which is itself equipped with a withdrawal zone; the plant furthermore equipped, at an outlet, with at least one magnetic separator followed by at least one cooling chamber cooled to a temperature below the Curie temperature of iron carbide and which includes, downstream, at least one magnetic separator for sorting the various components of an ore charge that enters.

6. Plant for implementing the process according to claim 1, further comprising a circulating fluidized bed reactor comprising, downstream of a withdrawal zone, a cooling chamber equipped, at an outlet thereof, with a magnetic separator for sorting the mixture into a magnetic fraction of iron and iron oxides and into a nonmagnetic fraction of iron carbide and gangue, the iron and iron oxides fraction, for conversion into iron carbide, being reintroduced into the bed of the reactor after having been heated in an exchanger, the non-magnetic fraction of iron carbide and gangue being sent to a second cooling step in order to reduce the temperature of the mixture to a temperature below the Curie temperature of iron carbide, this step having, downstream, a magnetic separation unit in order to sort the various components of entering fractions.

7. Plant for implementing the process according to claim 1, wherein the iron carbide particles are cooled to below 300° C. in chambers provided, at their outlet, and withdrawal zones to prevent the particle from igniting.

8. A method for purifying iron carbide comprising the steps:
   feeding ore to a reaction chamber;
   extracting a mixture of iron, iron oxides, gangue, and iron carbides from the reaction chamber;
   adjusting the temperature of the mixture to a range of 400°–500° C.;
   subjecting the mixture, at the adjusted temperature, to a first magnetic field for separating the mixture into a magnetic fraction including iron and iron oxides from a non-magnetic fraction including gangue and iron carbides;
   cooling the non-magnetic fraction of gangue and iron carbides below the Curie temperature of iron carbide; and
   subjecting the gangue and iron carbides to a second magnetic field for separating the iron carbides, that become magnetic, from the gangue that remains non-magnetic.

9. The method set forth in claim 8 together with the step of cooling the extracted mixture and recovering heat for recycling to the reaction chamber.

10. The method set forth in claim 8 together with the step of recycling separated iron and iron oxides to the reaction chamber.

11. The method set forth in claim 8 wherein the mixture is extracted from a first withdrawal point in the reactor, and further comprising the steps:
   extracting fines of the mixture, circulating in the reactor, at a second withdrawal point of the reactor;
   adjusting the temperature of the extracted fines mixture to a temperature range 400°–500° C.;
   subjecting the fines mixture, at the adjusted temperature, to a third magnetic field for separating the fines mixture into a magnetic fraction including iron and iron oxides from a non-magnetic fraction including gangue and iron carbides;
   cooling the fines non-magnetic fraction of gangue and iron carbides below the Curie temperature of iron carbide; and
   subjecting the gangue and iron carbides fines to a fourth magnetic field for separating the iron carbides fines, that become magnetic, from the gangue fines that remains non-magnetic.

12. The method set forth in claim 8 and further comprising the steps:
   extracting fines of the mixture, circulating in the reactor; and
   mixing the extracted fines with the extracted mixture of iron, iron oxides, gangue, and iron carbides from a reaction chamber.

13. The method set forth in claim 11 wherein the magnetic fraction of iron and iron carbides fines are recycled to the reactor.

* * * * *